Nov. 19, 1935.   A. L. FREEDLANDER   2,021,356
BELT CONNECTER
Filed Feb. 12, 1934   2 Sheets-Sheet 1
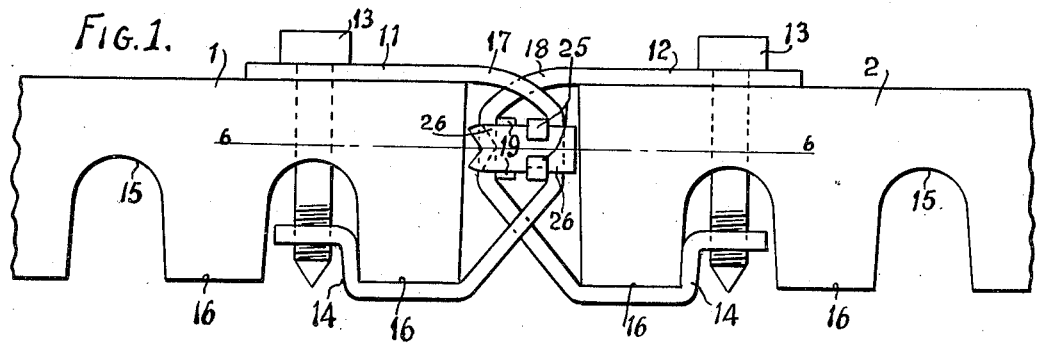
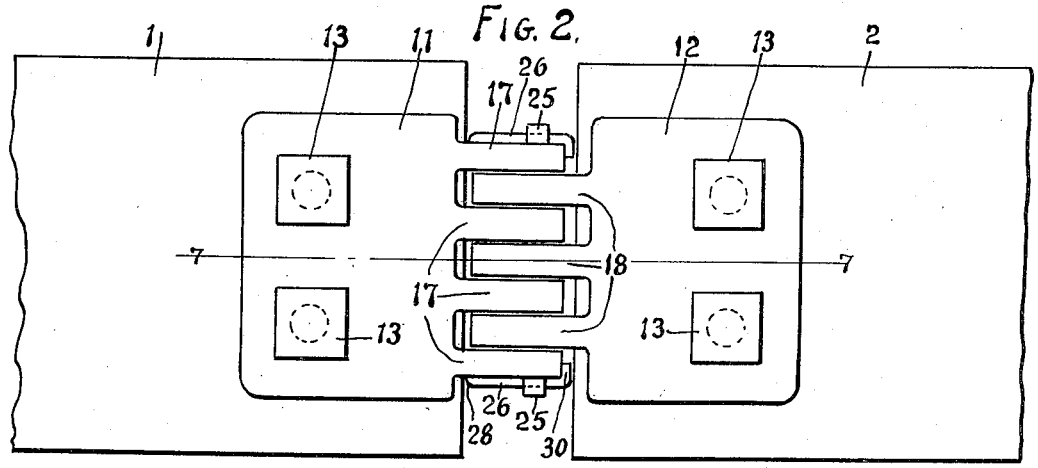
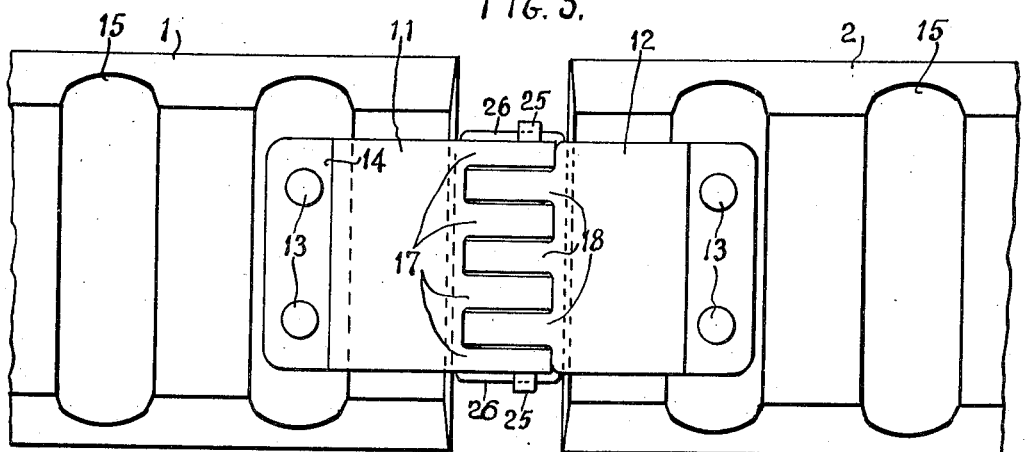
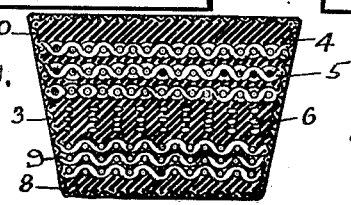
Inventor
ABRAHAM L. FREEDLANDER,
Attorneys Nov. 19, 1935.  A. L. FREEDLANDER  2,021,356
BELT CONNECTER
Filed Feb. 12, 1934   2 Sheets-Sheet 2
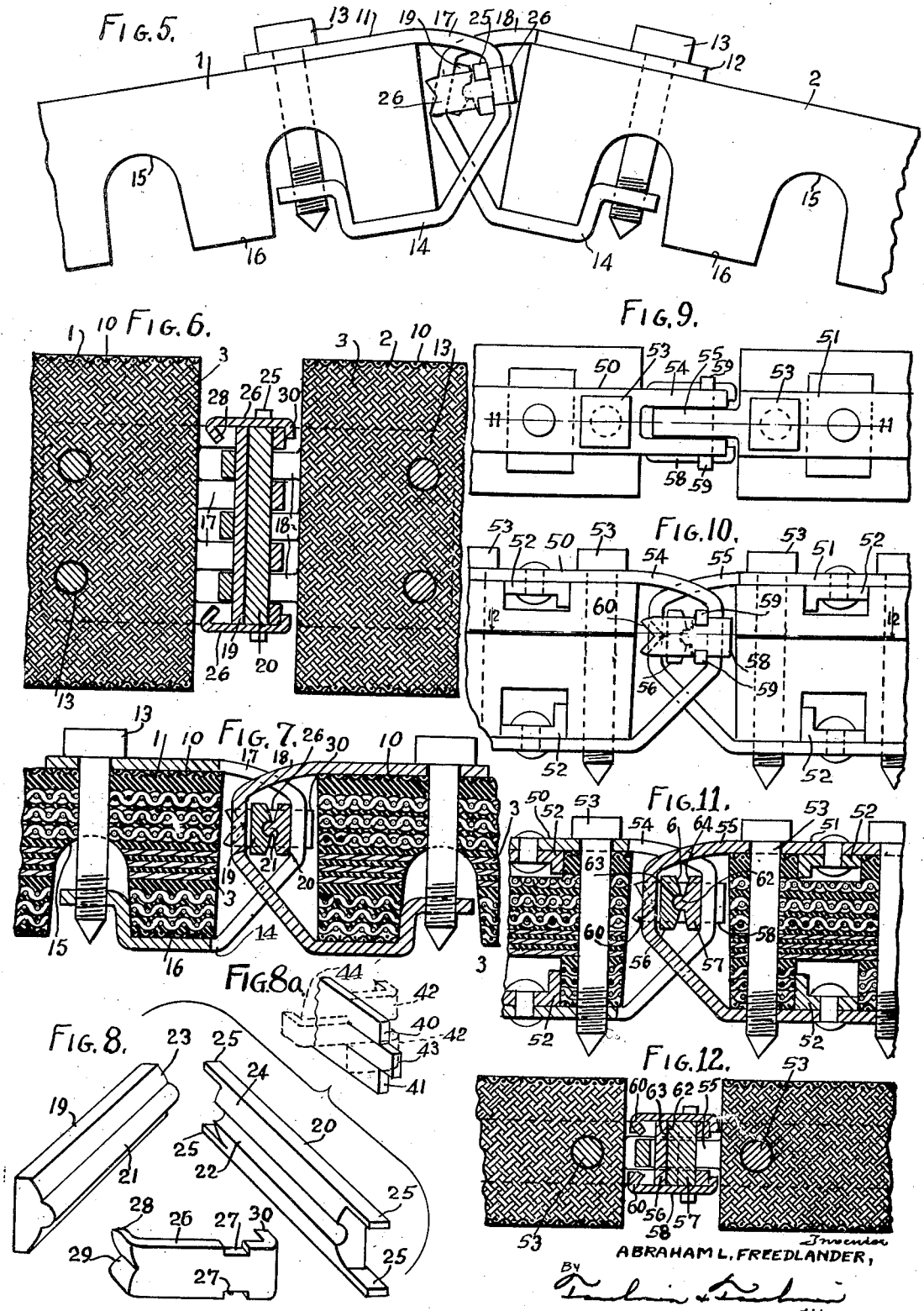
ABRAHAM L. FREEDLANDER, Patented Nov. 19, 1935

2,021,356

UNITED STATES PATENT OFFICE 2,021,356

BELT CONNECTER

Abraham L. Freedlander, Dayton, Ohio, assignor to The Dayton Rubber Manufacturing Company, Dayton, Ohio, a corporation of Ohio Application February 12, 1934, Serial No. 710,823

13 Claims. (Cl. 24—33)

This invention relates to belt connecters and especially to those types having clamping members and pintle members held therebetween.

The problem of this invention was to provide a belt connecter having pintle members which would not become dislodged from engagement with one another, either endwise or transversely, during conditions of continued operation, however severe; also to localize the wear between such pintle members at points where the latter were best adapted to receive it.

One object of my invention is to provide a belt connecter having interlacing clamping members with pintle members held therebetween, one of the pintle members having retaining clips or lugs at its ends for holding the other pintle member in engagement with it.

Another object is to provide such a belt connecter wherein one pintle member has retaining clips or lugs at its ends for anchoring it to one of the clamping members and also for holding the other pintle member in engagement with it.

Another object is to provide such a belt connecter with a pintle member having attachable clips arranged to be secured to its ends in order to hold the other pintle member in engagement with it.

Another object is to provide such a belt connecter with a pintle member having attachable clips arranged to be secured to its ends in order to anchor it to one of the clamping members, as well as to hold the other pintle member in engagement with it.

In the drawings:

Figure 1 is a side elevation of the ends of a belt of a trapezoidal cross section, held together by the belt connecter of my invention;

Figure 2 is a top plan view of the belt connecter shown in Figure 1;

Figure 3 is a bottom plan view of the belt connecter and belt shown in Figures 1 and 2;

Figure 4 is a cross section, in reduced scale, through the trapezoidal belt shown in Figures 1 to 3;

Figure 5 is a side elevation of the belt and connecter shown in Figure 1, but with the belt ends angled relative to one another;

Figure 6 is a horizontal section along the line 6—6 of Figure 1;

Figure 7 is a vertical section along the line 7—7 of Figure 2;

Figure 8 is a perspective view of the pintle member parts separated to show their construction;

Figure 8a shows a modified form of connection between the pintle members;

Figure 9 is a top plan view of the belt connecter of my invention as applied to a belt of hexagonal cross section;

Figure 10 is a side elevation of the construction shown in Figure 9;

Figure 11 is a vertical section along the line 11—11 of Figure 9;

Figure 12 is a horizontal section along the line 12—12 of Figure 10.

Referring to the drawings in detail, Figure 1 shows a belt with ends 1 and 2 having a trapezoidal cross section (Figure 4). This belt is preferably of a combined rubber-and-fabric construction, assembled in such a manner that the neutral axis section of the belt is substantially inextensible, the outer section slightly extensible, and the inner section slightly compressible. To accomplish it, neutral axis section of the belt contains tightly twisted cords 3 (Figure 4), running longitudinally through the belt and impregnated with the rubber material thereof. The outer portion 4 contains fabric layers 5 which are extensible in a longitudinal direction, but comparatively inextensible in a lateral direction. This latter feature may be accomplished by using a bias-laid fabric, or else by using a fabric whose threads are more tightly woven in one direction than in another: when the longitudinal threads 6 are loosely woven and the cross threads tightly woven, this condition will be achieved. The inner portion 8 of the belt may be made of solid rubber to provide a slight amount of compressibility, or else it may be of rubber impregnated with loosely arranged fabric 9 placed in a transverse direction. The belt may be provided with a wrapper 10 if desired.

The belt connecter of my invention consists of a pair of clamping members 11 and 12 secured to the belt ends 1 and 2 by the screws 13. The belt may be provided with cut-away portions 15 on its inner side to enhance the transverse flexibility of the belt, thereby providing tooth-like portions 16 which enable the belt to contract along its inner surface when passing around a pulley. The belt connecter clamping members 11 and 12 may be provided with bent portions 14 adapted to engage the tooth-like portions 16 of the belt and be held in position by the screws 13.

The clamping members 11 and 12 are provided with the interlacing tongues 17 and 18, whose ends pass by and between one another to provide a space for receiving pintle members 19 and 20 therebetween (Figures 1 and 8). The latter serve the purpose of providing a bearing and load-supporting connection between the clamping members 11 and 12.

The male pintle member 19 is provided with a projection 21 which is adapted to rockingly engage a corresponding depression 22 in the female pintle member 20. The facing surfaces 23 and 24 of the two pintle members are preferably arcuate to facilitate the rocking action. The ends of one of the pintle members, such as the female pintle member 20, are provided with lugs 25 which when bent serve to hold end clips 26 in engagement therewith. The end clips 26 are provided with recesses 27 suitable for receiving the lugs 25. One end of each clip 26 is bent approximately at right angles, as at 28, to provide an arm which holds the pintle members 19 and 20 loosely together in order to keep them from dislodgment yet permit rocking engagement between them. The end arm 28 of the clip 26 may be further provided with a projection 29 which serves to bear against the outer surface of the pintle member 19 and form a pivotal engagement therewith. This projection 29 is easily made by denting the end arms 28. The opposite end of each clip 26 may likewise be bent at right angles to form the end arms 30. The latter serve to anchor the pintle member 20 to the clamping member 11 by gripping its tongue portion 17.

It will be understood that where the term "rubber" is used herein, the word is intended to cover other materials which have similar action in the circumstances under which my invention would be used.

If desired, the end clips 26 may be made integral with the pintle member 20 (Figure 8a). The upper and lower lugs 40 and 41 may be bent backward as shown by the dotted lines 42 in order to serve the function of the bent end portions 30 in the clip 26. The middle lug 43 may be similarly bent forward, as shown in the dotted lines 44 to serve the same function as the bent end portion 28 of the clip 26.

Figures 9 to 12 show the belt connecter of my invention as applied to a belt of hexagonal cross section. The general arrangement of the belt connecter is, however, only slightly modified. It consists of clamping members 50 and 51 having intermediate lugs 52 for gripping the first cutaway portion of the belt. The opposite sides of the clamping members are connected by the screws 53 passing through the maximum thickness of the belt. The forward extensions 54 and 55 of the clamping members 50 and 51 respectively are flattened to provide a backing for the pintle members 56 and 57. The latter have flattened backs adapted to engage the flattened portions 54 and 55, and the pintle member 57 is anchored, in a manner similar to that previously described, by the end clip 58 joined thereto by the lugs 59. The clips 58, as before, are provided with pivot portions 60 adapted to pivotally engage the flat back surface of the pintle member 56, whose forward face 61 is of arcuate configuration. The pintle projection 62 is deeper than the groove 63 which it engages, thereby separating the opposing faces 61 and 64 of the pintle members 56 and 57.

It will be understood that I desire to comprehend within my invention such modifications as may be necessary to adapt it to varying conditions and uses.

Having thus fully described my invention, what I claim as new and desire to secure by Letters Patent is:

1. A belt connecter comprising interlaced clamping members, contacting pintle members arranged therebetween, and clips on one of said pintle members, each end of each clip having a bent portion anchored to one of said clamping members and for retaining the other pintle member in engagement therewith.

2. A belt connecter comprising interlaced clamping members, contacting pintle members arranged therebetween, and clips on one of said pintle members, each end of each clip having a bent portion anchored to one of said clamping members and for retaining the other pintle member in engagement therewith, said clips having projections arranged to provide pivotal contacts between said clips and the pintle member engaged thereby.

3. A belt connecter comprising interlaced clamping members with flattened forward portions having flat-backed pintle members arranged therebetween to engage said flattened portions, one of said pintle members having means engaging the back surface of its clamping member for anchoring said pintle member thereto, one of said pintle members having means engaging the back surface of the other pintle member for retaining the pintle members in engagement with one another.

4. A belt connecter comprising interlaced clamping members with flattened forward portions having flat-backed pintle members arranged therebetween to engage said flattened portions, one of said pintle members having means engaging the back surface of its clamping member for anchoring said pintle member thereto, one of said pintle members having means pivotally engaging the back surface of the other pintle member for retaining the pintle members in engagement with one another.

5. A belt connecter comprising interlaced clamping members and contacting pintle members arranged therebetween, one of said pintle members having bent end portions extending over the ends and back of the other pintle member, whereby to retain said pintle members against separation from one another.

6. A belt connecter comprising interlaced clamping members and contacting pintle members arranged therebetween, one of said pintle members having bent end portions extending over the ends and back of the other pintle member to engage the back thereof in a pivotal contact, whereby to retain said pintle members against separation from one another.

7. A belt connecter comprising interlaced clamping members and contacting pintle members arranged therebetween, one of said pintle members having bent end portions extending over the ends and back of the other pintle member to engage the back thereof, whereby to retain the other pintle member in engagement therewith.

8. A belt connecter comprising interlaced clamping members and contacting pintle members arranged therebetween, one of said pintle members having lugs on the ends thereof, one of which is bent in one direction to anchor it to the back of one of said clamping members and the others of which are bent in the opposite direction around the ends of the other pintle member to engage the back thereof, whereby to retain the respective pintle members in engagement.

9. A pintle assembly for a belt connecter comprising a male pintle member with a projection and a female pintle member with a cooperating depression, one of said pintle members having means extending from its ends and bent over the ends of the other pintle member to engage the back thereof, whereby to hold the other pintle member against separation therefrom in any direction.

10. A pintle assembly for a belt connecter comprising a male pintle member with a projection, a female pintle member having a depression, said projection being received within said depression, and means on one of said pintle members bent over the ends of the other pintle member to pivotally engage the back thereof, whereby to hold the other pintle member in engagement therewith against separation therefrom in any direction.

11. A pair of pintle members for a connecter having clips attached to the ends of one of said members and bent over the ends of the other pintle member to engage the back thereof, whereby to hold said pintle members in engagement with each other.

12. A pair of pintle members for a connecter, and clips attached to the ends of one pintle member, said clips having portions at the ends thereof and bent over the ends of the other pintle member to pivotally engage the back thereof, whereby to hold the pintle members in pivotal engagement with each other.

13. A belt connecter comprising interlaced clamping members with flattened forward portions having flat-backed pintle members arranged therebetween to engage said flattened portions, one of said pintle members having means extending therefrom and bent over the ends of the other pintle member to engage the back thereof for retaining the pintle members in engagement with one another.

ABRAHAM L. FREEDLANDER.